May 25, 1965  D. E. HARRIS  3,185,875

MOTOR TERMINAL ASSEMBLY

Filed Jan. 14, 1963  3 Sheets-Sheet 1

INVENTOR.
DWIGHT E. HARRIS
BY
*Kane, Dalsimer and Kane*
ATTORNEYS

May 25, 1965 D. E. HARRIS 3,185,875
MOTOR TERMINAL ASSEMBLY
Filed Jan. 14, 1963 3 Sheets-Sheet 2

INVENTOR.
DWIGHT E. HARRIS
BY
Kane, Dalsimer and Kane
ATTORNEYS

May 25, 1965 D. E. HARRIS 3,185,875
MOTOR TERMINAL ASSEMBLY
Filed Jan. 14, 1963 3 Sheets-Sheet 3

INVENTOR.
DWIGHT E. HARRIS
BY
Kane, Dalsimer and Kane
ATTORNEYS

United States Patent Office 3,185,875
Patented May 25, 1965

3,185,875
MOTOR TERMINAL ASSEMBLY
Dwight E. Harris, Woodstock, N.Y., assignor to Rotron Manufacturing Company, Inc., Woodstock, N.Y., a corporation of New York
Filed Jan. 14, 1963, Ser. No. 251,203
4 Claims. (Cl. 310—71)

This invention relates to a structurally and functionally improved terminal assembly for an electric motor and, in effect, provides a universal system capable of ready conformation to the requirements of an individual customer.

It is an object of the invention to provide a terminal system especially applicable to relatively small motors which will permit of an elective coupling of the terminals to current paths extending therefrom by means of a plug or a soldered connection. Also, by the design structure, it is feasible to position the capacitor of the motor so that it might properly be termed as being an integral part of the motor housing or otherwise may be remotely located.

A further object is that of providing a terminal assembly in association with a motor housing by a relatively inexpensive and simple structure which may be conformed to a customer's requirements by a relatively unskilled person and without the need of special tools or additional parts to meet the requirements of different assemblies.

With these and other objects in mind, reference is had to the attached sheets of drawings illustrating practical embodiments of the invention, and in which.

Figure 1:
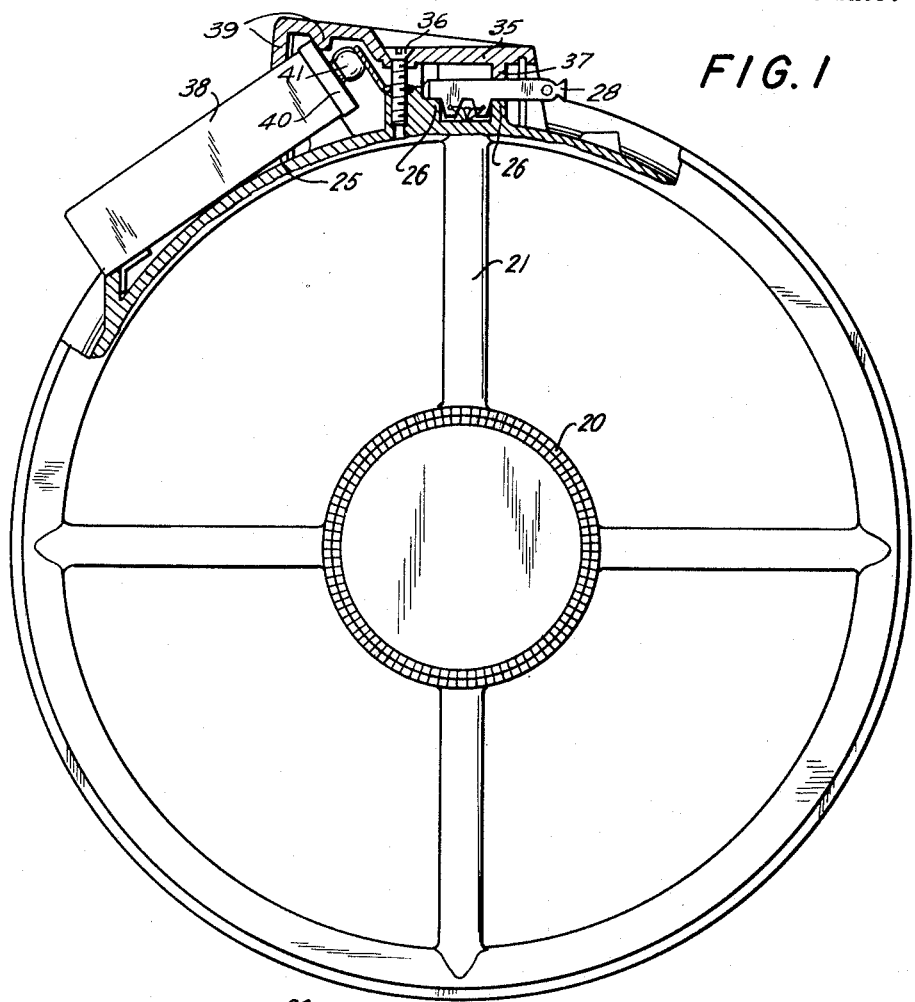
FIG. 1 is a partly sectional front view of a motor housing extended to furnish a fan guard and with which there is associated the improved terminal assembly.
Figure 2:
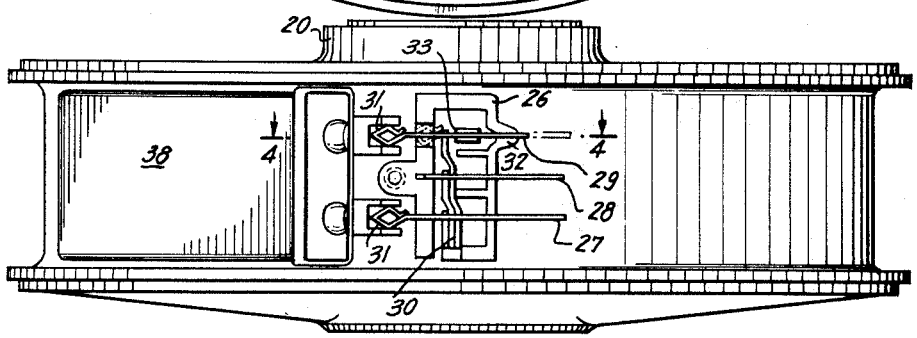
FIG. 2 is a plan view of the parts as shown in FIG. 1 with the shroud or cover of the assembly removed.
Figure 3:
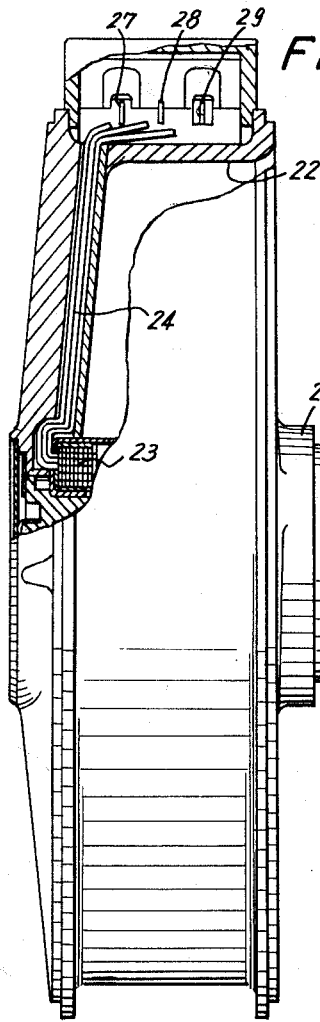
FIG. 3 is an edge or side view, partly in section, of the structure as illustrated in FIGS. 1 and 2.

Referring primarily to FIGS. 1, 2 and 3, the numeral 20 indicates a motor casing or encircling portion within which a driving motor may be enclosed or supported. Spokes 21 extend radially from the motor casing and support cylindrical guard ring 22. The motor casing 20, spokes 21 and guard ring 22 provide the motor housing. As will be understood, such a structure is especially applicable to an air impelling mechanism such as a fan. Obviously, if a motor forms a part of a different assembly or unit, then the housing might be correspondingly modified.

Thus, as in FIG. 3, the motor coils have been indicated as 23 within motor casing 20. Leads 24 extend outwardly from the motor coils toward guard ring 22 and terminate adjacent a station providing an area of support. That area, as is especially evident in FIGS. 1 and 2, may include a saddle or mounting 25 for a capacitor as well as an adjacent mounting in the form of a flange 26 defining a well portion (see FIG. 2) and serving as a support for terminals embraced in the conductive paths of the assembly. As will be understood, guard ring 22 or its equivalent will be formed of dielectric material or else have its surfaces covered with insulation such that proper circuits are feasible.

Three terminals 27, 28 and 29 are supported in the zone of mounting as defined by flange 26 and are connected to leads such as 30 defining proper conductive paths. Strips 27 and 28 in the illustrated embodiment are stationary and not shiftable. Strip 29 is retractable to the position shown in full lines in FIG. 2 and projectable as indicated in dotted lines in that figure. It, together with strip 27, is provided with terminal portions 31. The guiding of contact strip 29 and its maintenance in proper position is conveniently assured by including a projecting portion 32 as part of flange 26 and which slidably engages the side faces of strip 29. Additionally, a locating boss 33 may thus engage this contact strip which is furnished with a projecting portion 34 disposable to one or the other side of boss 33. A closure in the form of a shroud plate 35 normally overlies the assembly of contact strips and is secured in position by, for example, a screw 36 so that projecting portions such as flanges 37 formed on its inner face bear against these strips and especially strip 29, as in FIG. 1, to prevent dislodgement thereof from the position in which it has been disposed.

A capacitor 38 may be disposed upon the mountings provided in the saddle portion 25. The cover or shroud 35 is provided with extended portions 39 which in this position of the parts will, for example, overlie the flange 40 of the capacitor and beyond which its terminals 41 extend. Accordingly, this unit will be secured against dislodgement. Also, terminal portions 31 or strips 29 and 27 will engage those terminals if the former strip is retracted. Hence, a capacitor mounting is furnished in which that unit will become part of a compact assembly. This will meet the requirement of certain purchasers of the motor and associated parts embraced in the present teachings. Current will be externally supplied to the contact strips 27 and 28.

Figure 5:
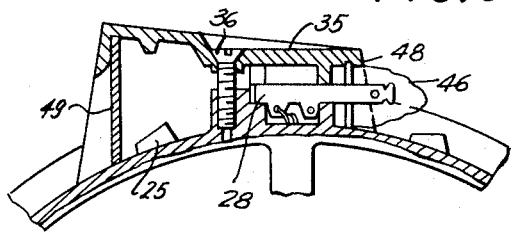
FIG. 5 is a fragmentary sectional view of the housing and one of the terminals of the assembly.
Figure 6:
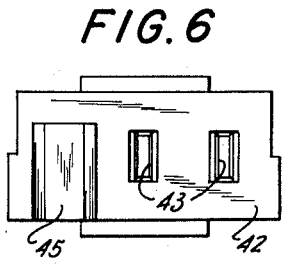
FIG. 6 is a front elevation of one form of plug and cord assembly which may be employed in the grouping of parts involved.
Figure 7:
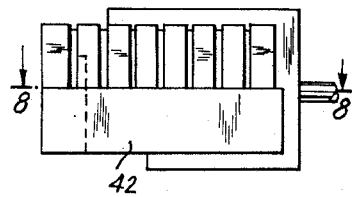
FIG. 7 is a side elevation of the unit as shown in FIG. 6.
Figure 8:
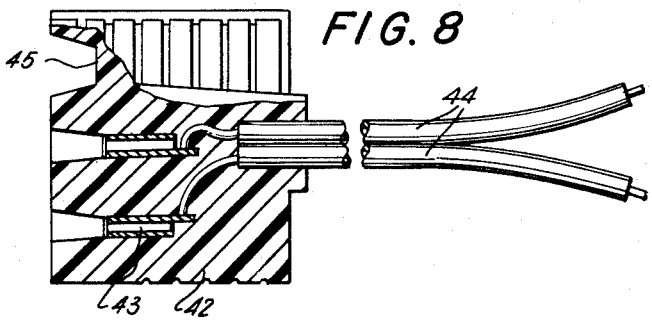
FIG. 8 is a partly sectional plan view taken along the line 8—8 in the direction of the arrows as indicated in FIG. 7.
Figure 4:
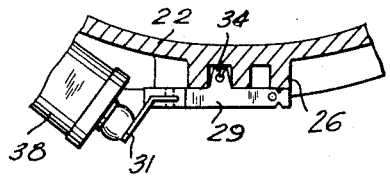
FIG. 4 is a sectional view, taken along the line 4—4 in the direction of the arrows as shown in FIG. 2.
Figure 9:
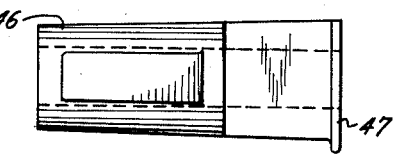
FIGS. 9, 10 and 11 are side, front and edge views of a terminal plug cover which may form a part of the assembly.
Figure 10:
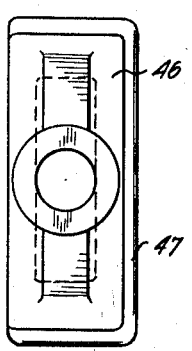
Figure 11:
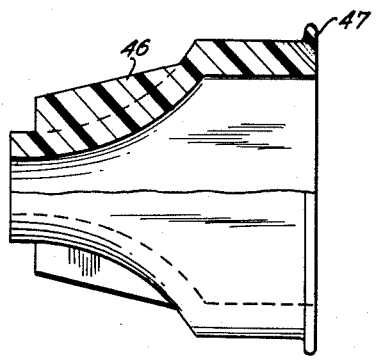
Figure 12:
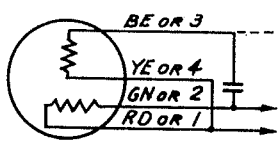
FIGS. 12, 13, 14 and 15 are illustrative of wiring diagrams which may be incorporated in the assembly.
Figure 13:
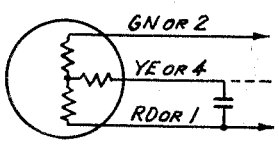
Figure 14:
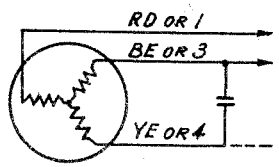
Figure 15:
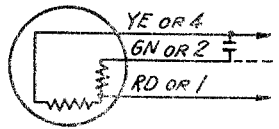

A plug of the type shown in FIGS. 6, 7 and 8 will form a part of the assembly. It will include an insulating body 42 provided with contacts 43 connected to the leads 44 embraced in a cord. A recess 45 for polarizing purposes may be present in body 42. A third electrical contact receptable for the accommodation of strip 29—when extended—may be included. So extended the strip will provide a connection to an external capacitor. Its extended position has been shown in dotted lines in FIG. 2 and in full lines in FIG. 5 and will be clear of the adjacent capacitor terminal 41. It is apparent that the number of contacts or equivalents might be increased as, for example, in the case of a ground connection being incorporated in the motor assembly. In that case the plug would include additional current connections such as 43 in line with the additional contact strip or strips. As in FIGS. 9, 10 and 11, terminal plug covers 46 may be employed which will have their bodies formed of suitable insulating material. These covers will conveniently include rim portions 47 extending outwardly of their bodies and receivable in grooves 48 formed in the guard portion 22 and the inner face of shroud plate 35 to be thus retained against displacement when the screw 36 or equivalent securing element retains the cover in position.

Where a customer desires that a remote capacitor be used, then no such unit is mounted upon the saddle portion 25. Instead, it will be disposed in any desired location and the open face defined on the left side of the shroud will be conveniently closed by a cover plate 49 as in FIG. 5. Before the shroud is mounted, contact strip 29 or its equivalent will be shifted to projected position (i.e., to the right as in FIGS. 1 and 2).

Various suggested circuit arrangements have been generally shown in FIGS. 12–15, inclusive. In any event, the present design allows the terminal or contact strip to be readily shifted to occupy one of two positions by simply removing the shroud, lifting and shifting the terminal and replacing the shroud. In all events the shroud cover will prevent displacement of the contact or terminal strip when screw 36 or its equivalent is tightened. Under the latter condition and with the capacitor in position as shown in FIG. 1, it will clamp against the surfaces of the latter to prevent its shifting. When the plug is present in the assembly it will serve as a guide and retainer for the latter in addition to its obvious functions as an insulator and protective housing. Finally, as afore brought out, it will serve to retain terminal cover members such as 46 against displacement.

From the foregoing it will be apparent that, among others, the several objects of the invention, as specifically aforenoted, are achieved. It is apparent that numerous changes in construction and rearrangements of the parts might be resorted to without departing from the spirit of the invention as defined by the claims.

I claim:

1. In combination a motor housing, a support extending therefrom, a plurality of terminals carried by said support, a shiftable terminal of said plurality slidably movable with respect thereto, a capacitor receiving well, a contact member of said capacitor receiving well, a first position of said shiftable terminal in contact with said contact member and a second position of said shiftable terminal spaced from said contact member.

2. In the combination as defined in claim 1, said shiftable terminal comprising a contact strip, a second contact strip adjacent thereto and carried by said support and a plug to couple with at least one of said strips and formed with a recess to accommodate the end of said shiftable terminal in said second position thereof.

3. In the combination as defined in claim 2, a shroud connectable with said housing to overlie said contact strips to retain them in position and said shroud providing a recess for the reception of said plug.

4. In the combination as defined in claim 1, a capacitor supported within said capacitor receiving well, a shroud also mounted on said housing and said shroud engaging said capacitor to retain it against displacement with respect to said housing.

References Cited by the Examiner

UNITED STATES PATENTS 3,002,676  10/61  Papsdorf _____ 310—71

MILTON O. HIRSHFIELD, *Primary Examiner.*